United States Patent Office 2,740,782
Patented Apr. 3, 1956

2,740,782

STEROIDS

John A. Hogg and Alan H. Nathan, Kalamazoo Township, Kalamazoo County, Mich., assignors to The Upjohn Company, Kalamazoo, Mich., a corporation of Michigan No Drawing. Application October 24, 1952,
Serial No. 316,801

15 Claims. (Cl. 260—239.57)

This invention relates to a novel class of steroid compounds, and is more specifically concerned with steroid-lacto-enol acylates and with a process for the production thereof.

It is an object of the present invention to provide the novel class of steroids named herein as steroid-lacto-enol acylates. Another object is the provision of a process for the production thereof. Other objects will be apparent to those skilled in the art to which this invention pertains.

The novel compounds of the present invention are steroid-lacto-enol acylates which may be represented by the following formula:

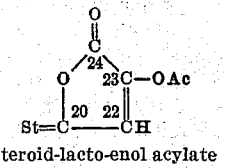

Steroid-lacto-enol acylate wherein St represents a cyclopentanopolyhydrophenanthrene radical having the indicated double bond attached at carbon atom 17; and wherein Ac represents the acyl radical of an organic carboxylic acid. These compounds are produced by reacting a cyclopentanopolyhydrophenanthrene compound possessing a 17-hydrogen, a 20-keto group, and a 21-glyoxalic acid group, with an acylating agent.

The preferred starting compounds of the present invention and the preferred 21-normethyl-23-acyloxy-17(20),22-choladieno-24-lactones produced therefrom may be graphically represented as follows:

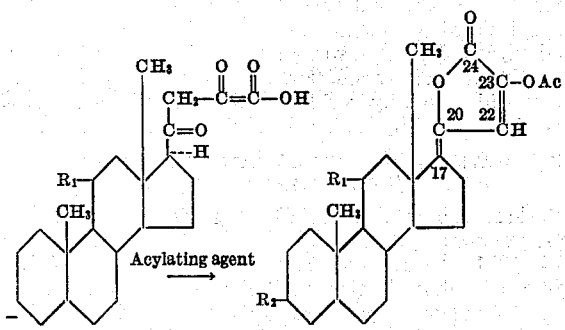

wherein R and $R_1$ are selected from the group consisting of hydrogen, hydroxy, ketonic oxygen, and acyloxy, acyloxy being of the formula AcO, wherein Ac is the acyl radical of an organic carboxylic acid, particularly acids containing from one to eight carbon atoms, inclusive, wherein $R_2$ is selected from the group consisting of hydrogen, ketonic oxygen and acyloxy groups, acyloxy having the above definition and wherein the steroid nucleus may have the normal or allo configuration. In the above formulae, when a keto group is present at position three, a double bond may also be present at position four, in which case the indicated 5-hydrogen atom is not present. When the three substituent is hydroxy or acyloxy, a double bond may also be present at the five position, in which case the indicated 5-hydrogen atom is again not present. Moreover, the indicated steroid nucleus may also have other or additional double bonds located at other positions of the molecule and may likewise contain other substituents such as hydroxy, acyloxy, ketonic oxygen, halo, or the like at positions of the molecule other than those indicated.

According to the method of the present invention, a steroid 20-keto-21-glyoxalic acid possessing a 17-hydrogen and a 21-hydrogen is contacted with an acylating agent to produce a steroid-lacto-enol acylate. The preferred embodiment of the invention resides in the preparation of the 21-normethyl-23-acyloxy-17(20),22-choladieno-24(20)-lactones.

The novel compounds of the present invention are useful precursors to steroids possessing a 17α-hydroxy group such as, for example, Kendall's compound E acetate (17α-hydroxy-21-acetoxy-4-pregnene-3,11,20-trione) or Kendall's compound F acetate (11β,17α-dihydroxy-21-acetoxy-4-pregnene-3,20-dione). For example, treatment of 3α,23-diacetoxy-11-keto-21-normethyl-17(20),22-choladieno-24(20)-lactone (Example 1) with perbenzoic acid, as illustrated in Example 9, followed by treatment of the reaction product with sodium hydroxide, as described in Example 10, is productive of the known 3α,17α-dihydroxypregnane-11,20-dione which can be converted to cortisone acetate by the procedure of Kritchevsky et al., J. Am. Chem. Soc. 74, 483 (1952). Similarly, other lacto-enol acylates of the present invention are converted to steroids possessing a 17α-hydroxy group.

The novel compounds of the present invention are well-defined, crystalline, stable, compounds which are insoluble in water. The unsaturation and oxygens present in the lactone side chain render the compounds susceptible to reactions useful in the production of a wide variety of steroids. Thus, the lacto-enol acylates of the present invention are not only useful precursors to known and physiologically active steroids, but they are also useful in the preparation of entirely new types of steroids possessing a fifth ring attached to carbon atom 17.

In carrying out the process of the present invention, a 20-ketosteroid-21-glyoxalic acid possessing a 17-hydrogen and a 21-hydrogen is contacted with an acylating agent to produce a 21-normethyl-23-acyloxy-17(20),22-choladieno-24(20)-lactone. The reaction is preferably conducted at a temperature between about room temperature, e. g., twenty degrees centigrade and the boiling point of the reaction mixture and in the presence of an organic solvent.

As disclosed previously and more fully illustrated by the formulae given above, steroid-21-glyoxalic acids possessing a 20-keto group, a 17-hydrogen and at least one hydrogen attached to carbon atom 21 are suitable starting materials for carrying out the process of the present invention. It is to be understood that concomitant reactions may occur at other active positions of the steroid nucleus, such as, for example, the esterification of a hydroxy group or the enol-esterification of a keto group. However these reactions, when present, are merely accompanying reactions and do not materially affect the formation of the desired lacto-enol acylate side chain. Moreover, they are not to be regarded as undesirable, since the original groups may be readily restored, as by hydrolysis, for example.

The reaction temperature utilized in carrying out the process of the present invention may vary from about room temperature to the boiling point of the reaction mixture, with the reaction time necessary for optimum yield of product being somewhat dependent upon the temperature chosen. Temperatures around room temperature require relatively long reaction times with one to two days being not uncommon, whereas when the reaction is carried out at the boiling point of the reaction mixture, less than an hour of reaction time is sometimes required to obtain a satisfactory yield of product.

Acylating agents most frequently employed in carrying out the process of the present invention are the anhydrides of organic carboxylic acids, particularly anhydrides of carboxylic acids containing from two to eight carbon atoms, inclusive. When a 23-formyloxy group is desired, formic acid is the preferred acylating agent. While organic carboxylic acid anhydrides and formic acid are preferred acylating agents in the process of the present invention, other acylating agents such as, for example, ketene or other like ketenes, isopropenyl acetate or other isopropenyl acylate, or the like, may also be used.

The process of the present invention is conveniently carried out in an organic solvent which is substantially non-reactive under the conditions of reaction. Reaction solvents which may be used include aliphatic acids such as, for example, acetic, propionic, butyric, or the like, pyridine, picoline, collidine, benzene, toluene, an excess of the acylating agent, mixtures of one or more of the above, and others.

Isolation of the thus-produced 21-normethyl-23-acyloxy-17(20),22-choladieno-24(20)-lactone is conveniently achieved by distillation of the reaction solvent and the excess acylating agent from the reaction mixture, leaving a residue consisting essentially of the lacto-enol acylate. Alternatively, the reaction product can be isolated by mixing the reaction mixture with water, thus precipitating the desired product, followed by filtration of the precipitated product. Purification of the reaction product may be accomplished by recrystallization of the reaction product from a solvent such as, for example, ether, ethyl acetate, ethanol, methanol, pentane, hexane, chloroform, acetic acid, mixtures of these, or the like.

The following examples are illustrative of the process and products of the present invention but are not to be construed as limiting.

PREPARATION 1.—SODIUM ENOLATE OF 21-ETHOXYOXALYL-3α-HYDROXYPREGNANE-11,20-DIONE

To a mixture of 3.4 milliliters of a 3.4 N solution of methanolic sodium methoxide, 19.5 milliliters of dry benzene and 0.5 milliliter of absolute ethanol, said mixture having been distilled until approximately eight milliliters of distillate had been collected and the mixture then cooled, was added 2.3 milliliters of ethyl oxalate with stirring followed by a solution of 3.32 grams (0.01 mole) of 3α-hydroxypregnane-11,20-dione in a mixture of thirty milliliters of dry benzene and five milliliters of absolute ethanol. The reaction mixture was stirred for 85 minutes during which time some solid material precipitated. Sixty milliliters of anhydrous ether was then added thereto and the whole stirred for an additional hour, whereafter an additional 100 milliliters of anhydrous ether was aded thereto. The ivory colored sodium enolate of 21-ethoxyoxalyl-3α-hydroxypregnane-11,20-dione thus precipitated was filtered, washed with ether and, after drying in a vacuum desiccator over Drierite (anhydrous calcium sulfate), was found to weigh 3.65 grams, a yield of 85 per cent of the theoretical. The product melted above 250 degrees centigrade.

A. 21-GLYOXALIC ACID OF 3α-HYDROXYPREGNANE-11,20-DIONE

Five hundred and sixty milligrams of the sodium enolate of 21-ethoxyoxalyl-3α-hydroxypregnane-11,20-dione was dissolved in a solution of seventy milligrams of potassium hydroxide in fifteen milliliters of a solution composed of equal parts of water and alcohol, whereafter the whole was heated for fifteen minutes on a steam bath. The cooled solution was then filtered and upon acidification there was slowly deposited 345 milligrams of a white crystalline precipitate of the 21-glyoxalic acid of 3α-hydroxypregnane-11,20-dione. The infrared analysis of said compound in solution (chloroform) verified the structure proposed.

Analysis.—Per cent calcd. for $C_{23}H_{32}O_6$: C, 68.29; H, 7.97. Found: C, 68.12; H, 7.87.

PREPARATION 2.—SODIUM ENOLATE OF 21-ETHOXYOXALYL-3β-HYDROXYPREGNANE-11,20-DIONE

Using essentially the procedure described in Preparation 1, 3β-hydroxypregnane-11,20-dione is converted to the sodium enolate of 21-ethoxyoxalyl-3β-hydroxypregnane-11,20-dione by reaction with ethyl oxalate and sodium in absolute ethanol.

A. 21-GLYOXALIC ACID OF 3β-HYDROXYPREGNANE-11,20-DIONE

In the same manner as described in Preparation 1A, the 21-glyoxalic acid of 3β-hydroxypregnane-11,20-dione is prepared from the sodium enolate of 21-ethoxyoxalyl-3β-hydroxypregnane-11,20-dione by reaction with sodium hydroxide in alcohol and water and thereafter acidifying the reaction mixture.

PREPARATION 3.—SODIUM ENOLATE OF 21-ETHOXYOXALYL-11-KETOPROGESTERONE

To a mixture of 3.4 milliliters of a 3.4 N methanolic sodium methoxide solution, 0.45 milliliter of absolute ethanol, and twenty milliliters of dry benzene, said mixture previously having been distilled until eight milliliters of distillate had been collected, and then cooled, was added 2.3 milliliters of ethyl oxalate and a solution of 3.28 grams of 11-ketoprogesterone in 38 milliliters of dry benzene. The solution became turbid and a yellow precipitate formed. The reaction mixture was stirred for ninety minutes, 55 milliliters of ether was then added thereto, and stirring was continued for sixty minutes, whereafter a 130-milliliter portion of ether was added thereto. The thus-formed yellow precipitate of the sodium enolate of 21-ethoxyoxalyl-11-ketoprogesterone was filtered, washed with several fifty-milliliter portions of ether, and after drying found to weigh 3.65 grams. The ether wash contained 0.54 gram of unreacted 11-ketoprogesterone. The yield of the sodium enolate of 21-ethoxyoxalyl-11-ketoprogesterone was 81 per cent of the theoretical or practically quantitative calculated on the reacted 11-ketoprogesterone.

A. 21-GLYOXALIC ACID OF 11-KETOPROGESTERONE

In the same manner as described in Preparation 1A, the 21-glyoxalic acid of 11-ketoprogesterone is prepared and isolated by treatment of the sodium enolate of 21-ethoxyoxalyl-11-ketoprogesterone with potassium hydroxide in alcohol and water, thereafter acidifying the mixture with dilute hydrochloric acid and then filtering the precipitated 21-glyoxalic acid of 11-ketoprogesterone.

PREPARATION 4.—SODIUM ENOLATE OF 21-ETHOXYOXALYL-11α-HYDROXYPROGESTERONE

Three and three-tenths (3.3) grams of 11α-hydroxyprogesterone [Peterson and Murray, J. Am. Chem. Soc. 74, 1871 (1952)] was dissolved in a solution of 0.25 gram of sodium in eighty milliliters of absolute ethanol, and 1.46 grams of ethyl oxalate was added thereto. The resulting solution was allowed to stand for six hours at room temperature, during which time the color of the solution changed from yellow to brown. The sodium enolate of 21-ethoxyoxalyl-11α-hydroxyprogesterone thus produced was isolated by the addition of a large volume of ether as a yellow amorphous solid, which decomposed above 200 degrees centigrade.

A. 21-GLYOXALIC ACID OF 11α-HYDROXYPROGESTERONE

In the same manner as described in Preparation 1A, the 21-glyoxalic acid of 11α-hydroxyprogesterone is prepared by the reaction of the sodium enolate of 21-ethoxyoxalyl-11α-hydroxyprogesterone with sodium hydroxide in a mixture of alcohol and water and thereafter acidifying the reaction mixture with dilute hydrochloric acid.

PREPARATION 5.—SODIUM ENOLATE OF 21-ETHOXYOXALYL-11β-HYDROXYPROGESTERONE

One hundred and forty-four (144) milligrams (6.25 millimoles) of sodium was dissolved in five milliliters of absolute ethanol under an atmosphere of nitrogen and to this solution were added eight milliliters of benzene and 0.8 milliliter (0.9 gram; 6.15 millimoles) of ethyl oxalate. The mixture was cooled in an ice-water bath and a solution of 1.99 grams (6.03 millimoles) of 11β-hydroxyprogesterone dissolved in five milliliters of absolute ethanol and mixed with 25 milliliters of dry benzene was added in a slow stream to the stirred solution. The reaction mixture was stirred at room temperature for 2.5 hours, at the end of which time a 100-milliliter portion of ether was added, followed by another 100-milliliter portion of ether one hour later. The thus-produced pale yellow precipitate of the sodium enolate of 21-ethoxyoxalyl-11β-hydroxyprogesterone was filtered and washed with ether. The yield was 1.68 grams (62 percent).

A. 21-GLYOXALIC ACID OF 11β-HYDROXYPROGESTERONE

In the same manner as described in Preparation 1A, the 21-glyoxalic acid of 11β-hydroxyprogesterone is prepared by reacting the sodium enolate of 21-ethoxyoxalyl-11β-hydroxyprogesterone with sodium hydroxide in water and alcohol and thereafter acidifying the reaction mixture.

In the same manner as described in Preparations 1 through 5, the 21-ethoxyoxalyl derivatives of the following compounds are prepared by reacting the following compounds with ethyl oxalate in the presence of base: progesterone, 3α- and 3β-hydroxy-5-pregnene-20-one, 3α- and 3β-hydroxypregnane-20-one, pregnane-3,20-dione, 11α- and 11β-hydroxypregnane-20-one, pregnane-3,11,20-trione, 3α,11α-, 3α,11β-, 3β,11α- and 3β,11β-dihydroxypregnane-20-one, 11α- and 11β-hydroxypregnane-3,20-dione, the allo steroids corresponding to these and other like steroids, organic carboxylic acid esters of the foregoing hydroxysteroids, and the like.

The 21-glyoxalic acids of the above-named compounds and others are prepared by reacting the 21-ethoxyoxalyl derivatives of the above-named compounds or the like with an alkali-metal hydroxide or similar hydrolyzing agent in alcohol and water or other suitable hydrolyzing solvent and thereafter acidifying the reaction mixture with dilute acid in a manner similar to the method described in Preparation 1A.

*Example 1.—3α,23 - diacetoxy - 11 - keto - 21 - nor - methyl-17(20),22-choladieno-24(20)-lactone*

A mixture of 2.918 grams of 3α-hydroxypregnane-11,20-dione-21-glyoxalic acid, 3.8 milliliters of a one Normal solution of hydrogen bromide in acetic acid, fifteen milliliters of acetic anhydride, and fifteen milliliters of glacial acetic acid was heated for one-half hour at the reflux temperature of the reaction mixture, whereafter the volatile components were removed by distillation at reduced pressure. The distillation residue was triturated with water until crystallization occurred. The crude crystalline mass was filtered and washed with water and thereafter dried. The yield of dry 3α,23-diacetoxy - 11 - keto - 21 - normethyl - 17(20),22 - choladieno-24(20)-lactone, melting at about 145 to 155 degrees centigrade with softening at 130 degrees, was 3.395 grams, representing a quantitative yield. Several recrystallizations from methanol or a mixture of ether and Skellysolve "B" hexane hydrocarbons in the proportion of about thirty milliliters of solvent per gram of product raises the melting point to 210 to 210.5 degrees centigrade.

*Analysis.*—Percent calcd. for $C_{27}H_{34}O_7$: C, 68.91; H, 7.28. Found: C, 68.81; H, 7.04.

*Example 2.—3α,23 - diacetoxy - 11 - keto - 21 - nor - methyl-17(20),22-choladieno-24(20)-lactone*

A solution of 685 milligrams of 3α-hydroxypregnane-11,20-dione-21-glyoxalic acid in 6.85 milliliters of pyridine and 6.85 milliliters of acetic anhydride was maintained at room temperature for twenty hours, whereafter the whole was poured into sixty milliliters of ice and water. After the excess acetic anhydride had hydrolyzed, the precipitated 3α,23-diacetoxy-11-keto-21-normethyl-17(20),22-choladieno-24(20)-lactone was filtered, washed with water and thereafter dried, first in the air and then in a vacuum oven. Infrared absorption analysis confirmed the identity of the product.

Treatment of 3α,23-diacetoxy-11-keto-21-normethyl-17(20),22-choladieno-24(20)-lactone or other 3α,23-diacyloxy homologues thereof with perbenzoic acid according to the method given in Example 9 and treating the reaction product with aqueous sodium hydroxide according to the method described in Example 10, is productive of 3α,17α-dihydroxypregnane-11,20-dione.

*Example 3.—3β,23 - diacetoxy - 11 - keto - 21 - nor - methyl-17(20),22-choladieno-24(20)-lactone*

In the same manner as described in Example 1, 3β,23-diacetoxy - 11 - keto - 21 - normethyl - 17(20),22 - choladieno-24(20)-lactone is prepared by reacting 3β-hydroxypregnane-11,20-dione-21-glyoxalic acid with acetic anhydride in glacial acetic acid and in the presence of anhydrous hydrogen chloride.

Isolation of the thus-produced 3β,23-diacetoxy-11-keto-21 - normethyl - 17(20),22 - choladieno - 24(20) - lactone is achieved by distillation of the reaction mixture and crystallizing the distillation residue from methanol.

Treatment of 3β,23 - diacetoxy - 11 - keto - 21 - normethyl-17(20),22-choladieno-24(20)-lactone or other 3β,23-diacyloxy homologues thereof with perbenzoic acid and thereafter with aqueous sodium hydroxide is productive of 3β,17α-dihydroxypregnane-11,20-dione.

*Example 4.—3α,23 - diacetoxy - 11β - hydroxy - 21 - normethyl-17(20),22-choladieno-24(20)-lactone*

In the same manner as described in Example 2, 3α,23-diacetoxy - 11β - hydroxy - 21 - normethyl - 17(20),22 - choladieno-24(20)-lactone is prepared by reacting 3α,11β-dihydroxypregnane-20-one-21-glyoxalic acid with acetic anhydride in pyridine.

Isolation of the desired product is accomplished by distilling the reaction mixture at reduced pressure, dissolving the residue in ether, washing the solution with dilute sodium hydroxide and water, respectively, and thereafter drying and diluting with Skellysolve "B" hexane hydrocarbons.

*Example 5.—3α,11α,23 - triacetoxy - 21 - normethyl - 17(20),22-choladieno-24(20)-lactone*

In the same manner as described in Example 4, 3α,11α,23 - triacetoxy - 21 - normethyl - 17(20),22 - choladieno-24(20)-lactone is prepared by substituting 3α,11α - dihydroxypregnane - 20 - one - 21 - glyoxalic acid for 3α,11β - dihydroxypregnane - 20 - one - 21 - glyoxalic acid as starting material in the reaction.

*Example 6.—3,11 - diketo - 21 - normethyl - 23 - acetoxy - 4,17(20),22-cholatrieno-24(20)-lactone*

In the same manner as described in Example 2, 3,11-diketo - 21 - normethyl - 23 - acetoxy - 4,17(20),22 - cholatrieno-24(20)-lactone is prepared from the 21-glyoxalic acid of 11-ketoprogesterone by treatment of the latter with acetic anhydride in pyridine.

Substitution of propionic anhydride for the acetic anhydride of the example is productive of 3,11-diketo-21- normethyl - 23 - propionoxy - 4,17(20),22 - cholatrieno - 24(20)-lactone.

*Example 7.—3-keto-11α,23-diacetoxy-21-normethyl-4,17(20),22-cholatrieno-24(20)-lactone*

In the same manner as described in Example 2, 3-keto-11α,23 - diacetoxy - 21 - normethyl - 4,17(20),22 - cholatrieno-24(20)-lactone is prepared from the 21-glyoxalic acid of 11α-hydroxyprogesterone by treatment of the latter with acetic anhydride in pyridine.

Similarly, 3-keto-11β-hydroxy-21-normethyl-23-acetoxy-4,17(20),22-cholatrieno-24(20)-lactone is prepared by substituting the 21-glyoxalic acid of 11β-hydroxyprogesterone for the 21-glyoxalic acid of 11α-hydroxyprogesterone in the reaction described above.

Substitution of propionic anhydride for the acetic anhydride of the example is productive of 3-keto-11α-acetoxy-21-normethyl-23-propionoxy-4,17(20),22-cholatrieno-24(20)-lactone.

*Example 8.—3-keto-11β-hydroxy-21-normethyl-23-acetoxy-17(20),22-choladieno-24(20)-lactone and 3-keto-11α,23 - diacetoxy - 21 - normethyl - 17(20),22 - choladieno-24(20)-lactone*

In the same manner as described in Example 2, 3-keto-11β - hydroxy - 21 - normethyl - 23 - acetoxy - 17(20),22-choladieno-24(20)-lactone is prepared from the 21-glyoxalic acid of 11β-hydroxypregnane-3,20-dione by reaction of the latter compound with acetic anhydride in pyridine.

Similarly, by substituting the 21-glyoxalic acid of 11α-hydroxypregnane-3,20-dione for the 21-glyoxalic acid of 11β-hydroxypregnane-3,20-dione in the above-described reaction, 3 - keto - 11α,23 - diacetoxy - 21 - normethyl - 17(20),22-choladieno-24(20)-lactone is prepared.

In the same manner as described in Examples 1 through 8, the 23-acyloxy homologues of these and other steroids wherein the acyloxy group has the formula AcO, Ac being the acyl radical of an organic carboxylic acid such as, for example, formic, acetic, propionic, butyric, valeric, hexanoic, heptanoic, octanoic, benzoic, or the like, are prepared by reacting the anhydride of the selected organic carboxylic acid, or with formic acid if formyloxy is the desired acyloxy radical, with the 21-glyoxalic acid of the selected steroid in a solvent such as, for example, pyridine, collidine, picoline, acetic acid, propionic acid, or the like.

21-glyoxalic acids of other steroids which may be used in carrying out the process of the present invention include the 21-glyoxalic acids of progesterone, 11α- and 11β-hydroxypregnane-20-one, 11β-hydroxyprogesterone, 3α- and 3β-hydroxypregnane-20-one, pregnane-3,20-dione, pregnane-3,11,20-trione, 3α- and 3β-hydroxy-5-pregnene-20-one, 3β,11α- and 3β,11β-dihydroxypregnane-20-one, 11α-hydroxypregnane-3,20-dione, the allo steroids corresponding to these and other like steroids, organic carboxylic acid esters of the foregoing hydroxysteroids, and others, all of which are prepared in the manner indicated in the foregoing preparation, i. e., reacting the selected starting steroid with an ester of oxalic acid in the presence of an alkali-metal base or alkali-metal alkoxide in a convenient organic solvent, followed by saponification in alkali solution and treatment with an acid to yield the corresponding 21-glyoxalic acid.

Representative other compounds prepared from these 21-glyoxalic acids in the manner described in Examples 1 through 8 include: 11α,23-diacetoxy-21-normethyl-17(20),22-choladieno-24(20)-lactone, 11β-hydroxy-21-normethyl - 23 - acetoxy - 17(20),22 - choladieno - 24 (20) - lactone, 11β - hydroxy - 3 - keto - 21 - normethyl - 23 - acetoxy - 4,17(20),22 - cholatrieno - 24(20) - lactone, 3α,23 - diacetoxy - 21 - normethyl - 17(20),22 - choladieno - 24(20) - lactone, 3β,23 - diacetoxy - 21 - normethyl - 17(20),22 - choladieno - 24(20) - lactone, 3 - keto - 21 - normethyl - 23 - acetoxy - 17(20),22 - choladieno - 24(20) - lactone, 3,11 - diketo - 21 - normethyl - 23 - acetoxy - 17(20),22 - choladieno - 24(20) - lactone, 3α,23 - diacetoxy - 21 - normethyl - 5,17(20),22 - cholatrieno - 24(20) - lactone, 3β,23 - diacetoxy - 21 - normethyl - 5,17(20),22 - cholatrieno - 24(20) - lactone, 3β,11α,23 - triacetoxy - 21 - normethyl - 17(20),22 - choladieno - 24(20) - lactone, 3β,11β,23 - triacetoxy - 21 - normethyl - 17(20),22 - choladieno - 24(20) - lactone, 11α,23 - diacetoxy - 3 - keto - 21 - normethyl - 17(20),22 - choladieno - 24(20) - lactone, 3α,23 - dipropionoxy - 11 - keto - 21 - normethyl - 17(20),22 - choladieno - 24(20) - lactone, 3β,23 - dibutyroxy - 11 - keto - 21 - normethyl - 17(20),22 - choladieno - 24(20) - lactone, 3 - keto - 21 - normethyl - 23 - valeroxy - 17(20),22 - choladieno - 24(20) - lactone, 3,11 - diketo - 21 - normethyl - 23 - hexanoyloxy - 17(20),22 - choladieno - 24 (20) - lactone, 11β - hydroxy - 3 - keto - 21 - normethyl - 23 - heptanoyloxy - 17(20),22 - choladieno - 24(20) - lactone, 3α,23 - dioctanoyloxy - 21 - normethyl - 5,17 (20),22 - cholatrieno - 24(20) - lactone, 3β,23 - diformyloxy - 21 - normethyl - 5,17(20),22 - cholatrieno - 24(20) - lactone, 3α,11α,23 - triformyloxy - 21 - normethyl - 17(20),22 - choladieno - 24(20) - lactone, 3α, 23 - dibenzoyloxy - 11β - hydroxy - 21 - normethyl - 17 (20),22 - choladieno - 24(20) - lactone, 3β,11α,23 - triformyloxy - 21 - normethyl - 17(20),22 - choladieno - 24(20) - lactone, 3β,23 - diformyloxy - 11β - hydroxy - 21 - normethyl - 17(20),22 - choladieno - 24(20) - lactone and others.

Contacting one of the above-named steroids, or the like, in an organic solvent, e. g., chloroform, with an organic peracid, e. g., perbenzoic acid, or hydrogen peroxide, followed by treatment with an aqueous or alcoholic alkali-metal hydroxide, e. g., sodium hydroxide, introduces a 17α-hydroxy group into the steroid nucleus. The following examples are illustrative.

*Example 9.—3α,23-diacetoxy-11-keto-17(20)-oxido-21-normethyl-22-choleno-24(20)-lactone*

A solution of 0.8 gram of 3α,23-diacetoxy-11-keto-21-normethyl-17(20),22-choladieno-24(20)-lactone, melting at 210 to 210.5 degrees centigrade, obtained according to the method described in Example 1, dissolved in twenty milliliters of chloroform, was mixed at room temperature with twenty milliliters of a solution of perbenzoic acid in benzene containing 61 milligrams of perbenzoic acid per milliliter. The consumption of the perbenzoic acid was followed by iodometric titration of aliquot samples taken from time to time from the reaction mixture. In about eight hours one molar equivalent of perbenzoic acid had been consumed and the consumption of perbenzoic acid thereafter essentially ceased. The reaction mixture was washed with successive portions of a dilute aqueous sodium bisulfite solution, sodium bicarbonate solution, and finally with water. After drying the benzene-chloroform layer with anhydrous sodium sulfate and thereafter distilling the solvent therefrom, an amorphous white powdery residue was obtained which crystallized upon trituration with 25 milliliters of denatured alcohol. The alcohol was then heated to boiling to dissolve all of the crystalline residue and was thereafter cooled, whereupon 437 milligrams, a yield of 66 percent of the theoretical, of white needles of 3,23-diacetoxy-11-keto-17(20)-oxido-21-normethyl-22-choleno-24(20)-lactone, melting at 179.5 to 181.5 degrees centigrade, crystallized therefrom. Further recrystallization of these crystals from alcohol gave product melting at 191 to 192 degrees centigrade (corrected).

*Analysis.*—Percent calcd. for $C_{27}H_{34}O_8$: C, 66.65; H, 7.04. Found: C, 66.85; H, 6.86.

*Example 10.—3α,17α-dihydroxypregnane-11,20-dione*

A solution of fifty milligrams of 3α,23-diacetoxy-11-keto - 17(20) - oxido - 21 - normethyl - 22 - choleno - 24(20)-lactone, obtained according to the method described in Example 9, dissolved in two milliliters of 95 percent ethanol, was heated to boiling and contacted while hot with about 0.5 milliliter of one Normal aqueous sodium hydroxide. The solution was then heated at the boiling point of the reaction mixture for five minutes and thereafter maintained at room temperature for sixteen hours. The solution was made acidic with dilute hydrochloric acid, whereupon 42 milligrams of a white solid precipitated. These crystals were dissolved in two milliliters of a one Normal sodium hydroxide solution and heated on a steam bath for about five minutes whereupon 15.2 milligrams of white crystals of 3α,17α-dihydroxypregnane-11,20-dione, melting at 195.5 to 199 degrees centigrade, precipitated. Recrystallization of these crystals from dilute methanol raised the melting point of the product to 203 to 204.5 degrees centigrade, which was not depressed upon taking a mixed melting point with authentic 3α,17α-dihydroxypregnane-11,20-dione. The infrared absorption spectrum also confirmed the identity of the product.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the production of 3α,23-diacetoxy-11-keto - 21 - normethyl - 17(20),22 - choladieno - 24(20) - lactone which comprises: contacting 3α-hydroxypregnane-11,20-dione-21-glyoxalic acid with acetic anhydride in an organic solvent and at a temperature between about twenty degrees centigrade and the boiling point of the reaction mixture to produce 3α,23-diacetoxy-11-keto-21-normethyl-17(20),22-choladieno-24(20)-lactone.

2. A process for the production of 3β,23-diacetoxy-11-keto - 21 - normethyl - 17(20),22 - choladieno - 24(20) - lactone which comprises: contacting 3β-hydroxypregnane-11,20-dione glyoxalic acid with acetic anhydride in an organic solvent and at a temperature between about twenty degrees centigrade and the boiling point of the reaction mixture to produce 3β,23 - diacetoxy - 11 - keto - 21 - normethyl - 17(20),22 - choladieno - 24(20) - lactone.

3. A process for the production of 3α,11α,23-triacetoxy-21 - normethyl - 17(20),22 - choladieno - 24(20) - lactone which comprises: contacting 3α,11α-dihydroxypregnane-20-one-21-glyoxalic acid with acetic anhydride in an organic solvent and at a temperature between about twenty degrees centigrade and the boiling point of the reaction mixture to produce 3α,11α,23-triacetoxy-21-normethyl-17-(20),22-choladieno-24(20)-lactone.

4. A process for the production of 3-keto-11β-hydroxy-21-normethyl-23-diacetoxy-17(20),22-choladieno-24(20)-lactone which comprises: contacting 11β-hydroxypregnane-3,20-dione-21-glyoxalic acid with acetic anhydride in an organic solvent and at a temperature between about twenty degrees centigrade and the boiling point of the reaction mixture to produce 3 - keto - 11β - hydroxy - 21 - normethyl - 23 - diacetoxy - 17(20),22 - choladieno - 24 - (20)-lactone.

5. A process for the production of 3,11-diketo-21-normethyl - 23 - acetoxy - 4,17(20),22 - cholatrieno - 24 - (20)-lactone which comprises: contacting 11 - ketoprogesterone-21-glyoxalic acid with acetic anhydride in an organic solvent and at a temperature between about twenty degrees centigrade and the boiling point of the reaction mixture to produce 3,11 - diketo - 21 - normethyl - 23 - acetoxy - 4,17(20),22 - cholatrieno - 24(20) - lactone.

6. A 3,23 - di - lower - acyloxy - 21 - normethyl - 17 - (20),22 - choladieno - 24(20) - lactone, wherein the acyloxy groups are of the formula AcO, Ac being the acyl radical of a hydrocarbon carboxylic acid containing from one to eight carbon atoms, inclusive of the formula:

7. A 3,23 - diacetoxy - 21 - normethyl - 17(20),22 - choladieno - 24(20)-lactone of the formula:

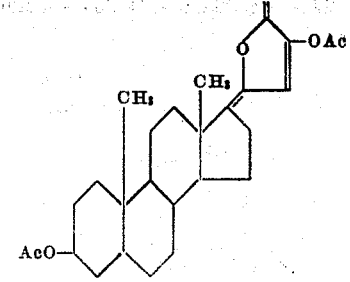

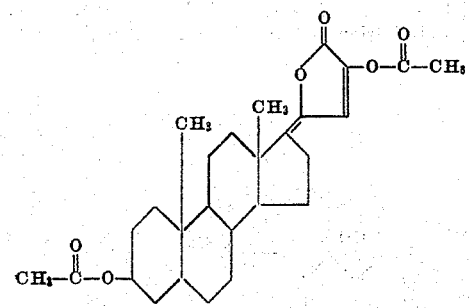

8. 3α,23 - diacetoxy - 11 - keto - 21 - normethyl - 17 - (20),22 - choladieno - 24(20) - lactone of the formula:

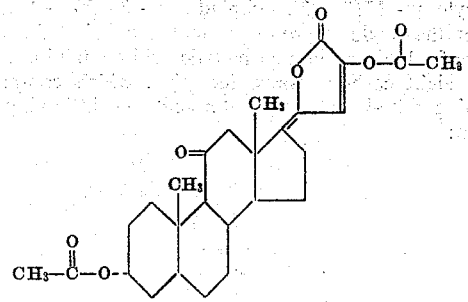

9. 3β,23 - diacetoxy - 11 - keto - 21 - normethyl - 17 - (20),22 - choladieno - 24(20) - lactone of the formula:

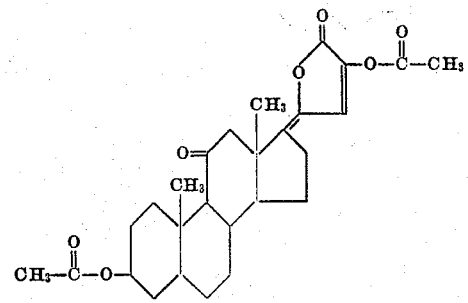

10. 3α,11α,23 - triacetoxy - 21 - normethyl - 17(20),22-choladieno-24(20)-lactone of the formula:

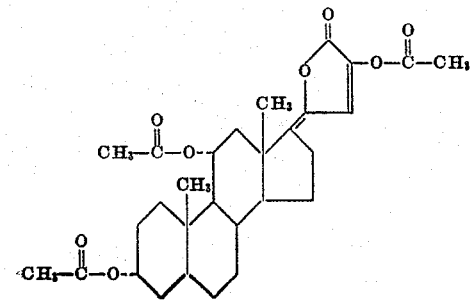

11. 3 - keto - 11β - hydroxy - 21 - normethyl - 23 - acetoxy - 17(20),22 - choladieno - 24(20) - lactone of the formula:

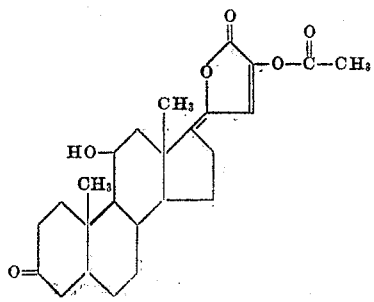

12. 3,11 - diketo - 21 - normethyl - 23 - acetoxy - 4,17 - (20),22 - cholatrieno - 24(20) - lactone of the formula:

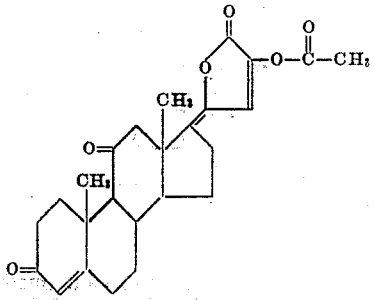

13. A process for the production of a 21 - normethyl - 23 - acyloxy - 17(20),22 - choladieno - 24(20) - lactone wherein the acyloxy group is AcO, Ac being the acyl radical of a hydrocarbon carboxylic acid containing from one to eight carbon atoms, inclusive, which comprises contacting a 20-keto-21-glyoxalic acid steroid having the formula:

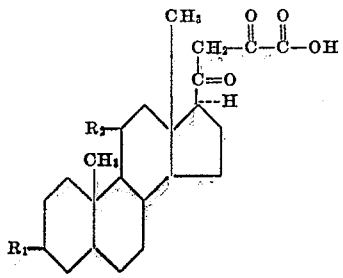

wherein $R_1$ is selected from the group consisting of hydroxy, ketonic oxygen and an acyloxy group of the formula AcO, wherein Ac represents the acyl radical of an organic carboxylic acid containing from one to eight carbon atoms, inclusive, and wherein $R_2$ is selected from the group consisting of hydrogen, hydroxy, ketonic oxygen and an acyloxy group wherein the acyloxy group is AcO, Ac being the acyl radical of an organic carboxylic acid containing from one to eight carbon atoms, defined as above with an acylating agent, selected from the group consisting of formic acid and acid anhydride of a hydrocarbon carboxylic acid containing from two to eight carbon atoms, inclusive, in an organic solvent to produce the corresponding 21 - normethyl - 23 - acyloxy - 17(20),22 - choladiene.

14. Process of claim 13 wherein the acylation is conducted at a temperature between about twenty degrees centigrade and the boiling point of the reaction mixture.

15. A 21 - normethyl - 23 - lower - acyloxy - 17(20), - 22 - choladieno - 24(20) - lactone represented by the following formula:

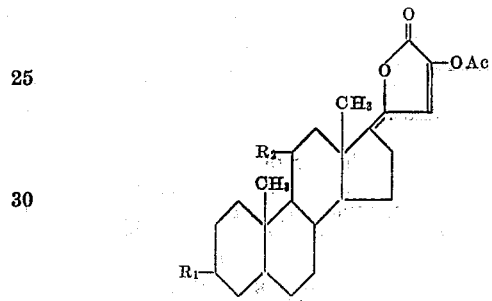

wherein $R_1$ is selected from the group consisting of ketonic oxygen, and an acyloxy group having the formula AcO, Ac being the acyl radical of a hydrocarbon carboxylic acid containing from one to eight carbon atoms, inclusive, and wherein $R_2$ is selected from the group consisting of hydrogen, ketonic oxygen, hydroxy, and acyloxy as defined above.

No references cited.